US011894787B2

(12) United States Patent
Znaty et al.

(10) Patent No.: US 11,894,787 B2
(45) Date of Patent: Feb. 6, 2024

(54) OPTIMIZED BRUSHLESS DC (BLDC) MOTOR DRIVE SYSTEM

(71) Applicant: IRP NEXUS GROUP LTD, Nes Ziona (IL)

(72) Inventors: Uriel Znaty, Herzliya (IL); Shmuel Ben Yaacov, Tel Yitzhak (IL); Paul Price, Nes-Ziona (IL)

(73) Assignee: IRP NEXUS GROUP LTD, Nes Ziona (IL)

( * ) Notice: Subject to any disclaimer, the term of this patent is extended or adjusted under 35 U.S.C. 154(b) by 0 days.

(21) Appl. No.: 17/784,428

(22) PCT Filed: Dec. 16, 2020

(86) PCT No.: PCT/IL2020/051293
§ 371 (c)(1),
(2) Date: Jun. 10, 2022

(87) PCT Pub. No.: WO2021/124326
PCT Pub. Date: Jun. 24, 2021

(65) Prior Publication Data
US 2023/0006591 A1  Jan. 5, 2023

(30) Foreign Application Priority Data

Dec. 16, 2019 (IL) .......................... 271478

(51) Int. Cl.
*H02P 23/14* (2006.01)
*H02P 25/03* (2016.01)
(Continued)

(52) U.S. Cl.
CPC ................ *H02P 23/14* (2013.01); *H02P 3/18* (2013.01); *H02P 25/03* (2016.02); *H02P 27/06* (2013.01)

(58) Field of Classification Search
CPC .......... H02P 27/08; H02P 27/06; H02P 23/14; H02P 3/18; H02P 2201/09; H02P 6/182
See application file for complete search history.

(56) References Cited

U.S. PATENT DOCUMENTS 10,333,447 B2 * 6/2019 Price .......................... H02P 6/06
10,576,828 B2 * 3/2020 Thongam ............... H02M 3/158
(Continued)

FOREIGN PATENT DOCUMENTS

EP    1416632 A1 *  5/2004 ............... H03K 4/00
EP    1416632        6/2004
(Continued)

OTHER PUBLICATIONS

PCT International Search Report and Written Opinion for corresponding Application No. PCT/IL2020/051293, dated May 25, 2021, 7 pages.

*Primary Examiner* — Thai T Dinh
(74) *Attorney, Agent, or Firm* — Dority & Manning, P.A.

(57) ABSTRACT

A drive system for a BLDC motor having poles implemented by separate coils that are activated in corresponding phases, which comprises a controller for controlling the level and phase of input voltages supplied to the separate coils; a controlled inverter with outputs, for applying phase-separated input voltages to each of the separate coils at desired timing for each input voltage, determined by the controller; a power source for feeding power to the controlled inverter; an up/down DC-DC converter for converting the feeding power to the input voltages according to a command signal provided by the controller. The controller is adapted to sample the instantaneous angle of the rotor of the BLDC motor; sample the input voltage input voltage and the current of each phase to obtain the input power P; and for each input voltage, calculate the phase difference value that corresponds to the input power and feeds the phase differ- (Continued)

ence value to the up/down DC-DC converter, thereby causing the up/down DC-DC converter to apply each input voltage to its corresponding coil at a specific timing for obtaining an optimal match between each input voltage and the current that is being built up in the corresponding coil.

20 Claims, 12 Drawing Sheets

(51) Int. Cl.
*H02P 3/18* (2006.01)
*H02P 27/06* (2006.01)

(56) References Cited

U.S. PATENT DOCUMENTS

| | | | |
|---|---|---|---|
| 10,707,796 B2* | 7/2020 | Price | H02P 23/0004 |
| 11,476,788 B1* | 10/2022 | Ben Yaakov | H02P 27/08 |
| 2014/0176085 A1* | 6/2014 | Maruno | G01R 31/392 |
| | | | 320/162 |
| 2014/0236405 A1* | 8/2014 | Wakashiro | B60L 50/10 |
| | | | 903/903 |
| 2017/0244350 A1* | 8/2017 | Price | H02P 6/06 |
| 2018/0198401 A1* | 7/2018 | Thongam | B60L 7/14 |
| 2020/0153335 A1* | 5/2020 | Na | H02M 1/0043 |

FOREIGN PATENT DOCUMENTS

| | | | |
|---|---|---|---|
| JP | 2006067667 | | 3/2006 |
| JP | 2006067667 A | * | 3/2006 |

\* cited by examiner

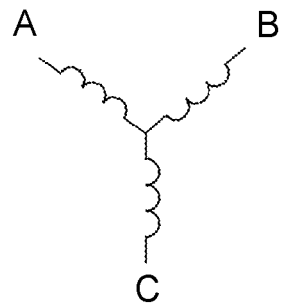
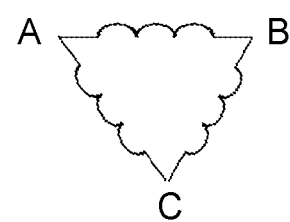
Fig. 3a (prior art)  Fig. 3b (prior art)
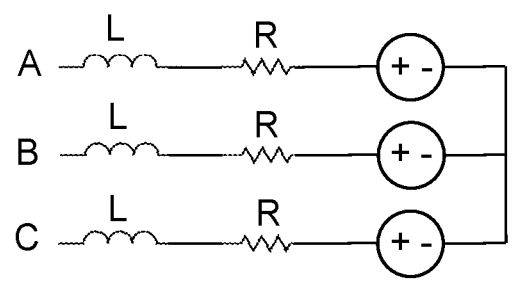
Fig. 4 (prior art)
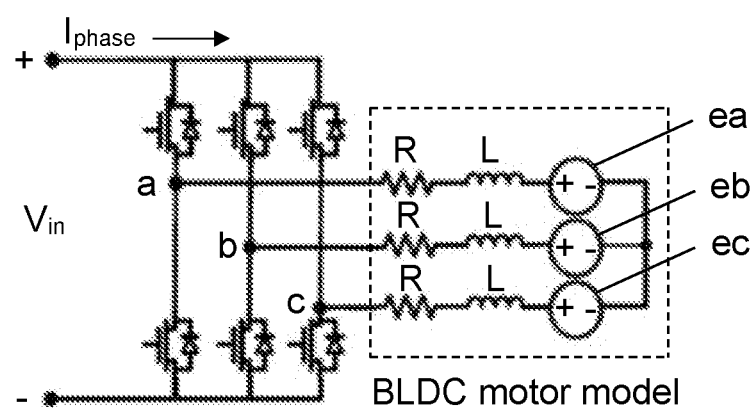
Fig. 5 (prior art)

OPTIMIZED BRUSHLESS DC (BLDC) MOTOR DRIVE SYSTEM

CROSS REFERENCE TO RELATED APPLICATIONS

This application is the U.S. National Stage entry of International Application No. PCT/IL2020/051293 filed under the Patent Cooperation Treaty on Dec. 16, 2020, which claims priority to Israeli Patent Application No. 271478 filed on Dec. 16, 2019, both of which are incorporated herein by reference.

FIELD OF THE INVENTION

The present invention relates to the field of DC motor drive systems. More particularly, the invention relates to a method and circuitry for performing efficient bidirectional power transfer and accurate phase correction of DC motor drives.

BACKGROUND OF THE INVENTION

In brushless motors, there is a permanent magnet which is a part of the rotor and surrounding several coils which are a part of the stator. When a coil is activated, the generated magnetic field attracts/detracts one of the poles of the rotor magnets in order to start and maintain rotation. Then the next coil is activated and so on. FIG. 1 (prior art) shows a motor in which the permanent magnets are in the center, surrounded by several coils that function as controlled electromagnets. FIG. 2 (prior art) shows a motor in which several coils that function as controlled electromagnets the permanent magnets are in the center, surrounded by permanent magnets.

FIGS. 3a and 3b show star and triangular motor topology, respectively. Most of the motors are implemented in a star topology, which has less power losses than the triangular configuration which may have a parasitic circulating current. Generally, the model of a motor can be illustrated by a star connection of three equivalent circuits, each of which consisting of a serial connection of an inductor L, a resistor R and a voltage source representing the electromotive force (EMF) generated when the inductor passes (via rotation) a permanent magnet, as shown in FIG. 4. The magnitude of the EMF depends on the rotation velocity of the rotor. Therefore, increasing the applied voltage (at points A, B and C) increases the rotor's rotation velocity.

FIG. 5 (prior art) shows a typical motor drive circuit using an inverter that generates the required voltages (A, B and C) and phase differences. For optimal operation, the current in each branch should be in phase with the EMF sensed by the motor poles, as shown in FIG. 6 (showing a six step operation). It can be seen that the phase of each branch is shifted by 120° with respect to the other branches. The current flowing in the motor is proportional to the torque applied to the rotor. For example, if the motor drives a car on a steep road, the current increases due to higher required torque.

FIG. 7 (prior art) shows a motor drive circuit where the speed is controlled by the magnitude of a variable input voltage Vin. Alternatively, it is possible to control the motor speed by applying a constant Vin and using PWM to control the effective current that reaches each branch. The input voltage may also be sinusoidal, generated by PWM, in order to obtain a smoother rotation pattern. However, PWM suffers from high switching losses in continuous drive, acceleration and especially in deceleration (braking) when power regeneration is desired.

FIG. 8 (prior art) shows a motor drive circuit where the coils are separated and the input voltage is applied individually to each coil. This has an advantage, since each coil can receive the maximum possible input voltage and therefore, higher speeds and better dynamics can be obtained. However, separate coils may suffer from currents unbalance due to differences in voltage drops of phases and timing imperfection.

When motors are driven continuously, being accelerated or decelerated, there exists a phase-shift between the phase voltages and the EMF voltages. The magnitude of this phase difference is a function of the phase impedance (equivalent R and L), the magnitude of the current and the rotating magnetic field frequency as shown in FIG. 9 for a six-step drive. This entails the generation of unwanted reactive power, which lowers the motor efficiency due to the increased losses.

One of the known solutions to this problem is called Field Oriented Control (FOC), which is illustrated schematically in FIG. 10. According to this solution, by measuring the currents $I_B$ and $I_C$ in two branches, it is possible to calculate the correct phase of applying the input voltage Vin to each branch (phase), for example, using the Clarke-Park transformation (in which phase currents and voltages are expressed in terms of current and voltages space vectors). However, FOC (which assumes sinusoidal magnetic field) is less accurate for rectangular pulses of Vin and requires considerable computing power.

It is therefore an object of the present invention to provide a method and circuitry for an efficient bidirectional motor drive and phase correction of motor drives, which is more accurate than prior art methods.

Other objects and advantages of the invention will become apparent as the description proceeds.

SUMMARY OF THE INVENTION

Method for efficiently providing drive power to a BLDC motor, comprising the steps of:
a) providing a BLDC motor having separate coils;
b) providing a controller for controlling the level and phase of input voltages supplied to the separate coils;
c) providing a controlled inverter with outputs, for applying phase-separated input voltages to each of the separate coils at desired timing for each input voltage, determined by the controller;
d) providing a power source for feeding power to the controlled inverter;

the controller is adapted to:
e) sample the instantaneous angle φ of the rotor of the BLDC motor;
f) measure the input power P to all phases; and
g) for each input voltage, calculate the phase difference Δφ value and the inverter's modulation level that corresponds to the input power P and feed the phase difference value to the controlled inverter.

The phase difference Δφ value may be calculated for obtaining one or more of the following:
  desired angular velocity
  desired torque;
  desired phase current.

In one aspect, an up/down DC-DC converter is provided for converting the feeding power to the input voltages according to a command signal provided by the controller.

The power source may be one of the following:
a battery;
an AC power grid followed by a bridge rectifier.

The inverter's modulation type may be Pulse Width Modulation (PWM) or Space Vector Modulation (SVM).

The DC-DC converter may be selected from the group of:
bidirectional converter;
bidirectional Buck/boost converter;
bidirectional multiphase converter.

In one aspect, the method comprises the following steps:
a) providing a BLDC motor having separate coils;
b) providing a controller for controlling the level and phase of input voltages supplied to the separate coils;
c) providing a controlled inverter with outputs, for applying phase-separated input voltages to each of the separate coils at desired timing for each input voltage, determined by the controller;
d) providing a power source for feeding power to the controlled inverter;
e) providing an up/down DC-DC converter for converting the feeding power to the input voltages according to a command signal provided by the controller,
the controller is adapted to:
f) sample the instantaneous angle φ of the rotor of the BLDC motor;
g) sample the input voltage Vin and the current I of each phase to obtain the input power P; and
h) for each Vin, calculate the phase difference Δφ value that corresponds to the input power P and feeds the phase difference value to the up/down DC-DC converter, thereby causing the up/down DC-DC converter to apply each Vin to its corresponding coil at a specific timing for obtaining an optimal match between each Vin and the current that is being built up in the corresponding coil.

The up/down DC-DC converter may be bidirectional, for allowing excess power generated in the motor to flow back to the power source, for during regeneration operating mode, where the voltage E across the motor's coils is greater than the input voltage Vin.

A drive system for a BLDC motor having poles implemented by separate coils that are activated in corresponding phases, which comprises:
a) a controller for controlling the level and phase of input voltages supplied to the separate coils;
b) a controlled inverter with outputs, for applying phase-separated input voltages to each of the separate coils at desired timing for each input voltage, determined by the controller;
c) a power source for feeding power to the controlled inverter;
d) an up/down DC-DC converter for converting the feeding power to the input voltages according to a command signal provided by the controller,
the controller is adapted to:
e) sample the instantaneous angle φ of the rotor of the BLDC motor;
f) sample the input voltage Vin and the current I of each phase to obtain the input power P; and
g) for each Vin, calculate the phase difference Δφ value that corresponds to the input power P and feeds the phase difference value to the up/down DC-DC converter, thereby causing the up/down DC-DC converter to apply each Vin to its corresponding coil at a specific timing for obtaining an optimal match between each Vin and the current that is being built up in the corresponding coil.

The drive system may comprise:
a) a bidirectional bridge connected to a power source having a constant voltage $V_B$ and being adapted to operate as a rectifier to one direction or as an inverter to the opposite direction;
b) a bidirectional Buck-boost converter connected to the bidirectional bridge;
c) a plurality of bridges, each of which distributing an input voltage Vin to a corresponding coil of the motor;
where the controller is adapted to:
d) calculate phase difference Δφ that corresponds to each value of power P and generate appropriate signals to the gates of the plurality of bridges;
e) push more power into the bidirectional bridge upon detecting that voltage $V_B$ decreases, and to return power into the power source upon detecting that voltage $V_B$ increases.

Up/down conversion may be performed in a relatively high frequency, while operating a plurality of bridges with relatively low frequency.

The drive system may be adapted to operate with a constant current or a constant power which are delivered to the motor.

In one aspect, during a regeneration operating mode when the voltage E across the motor's coils is greater that the input voltage Vin, the regeneration current is directed to flow via diodes.

During a regeneration operating mode when the voltage E across the motor's coils is greater than the input voltage Vin, the regeneration current may be directed to flow via transistors, parallelly connected to the diodes to reduce power losses.

The drive system may comprise:
a) a first comparator for measuring the current and compared the current to a desired reference current $I_{ref}$ and for outputting the difference between I
b) a second comparator which receives the output of the first comparator and samples the voltage Vin; and
c) a second phase compensator for changing the voltage Vin in a direction that causes the current I to be equal to the reference current $I_{ref}$.

Whenever the control is a power-based control, the system may comprise:
a) a comparator for comparing the product of the current I and the voltage Vin to a desired reference power $P_{ref}$
b) a first phase compensator that receives the difference between P and $P_{ref}$;
c) a second comparator which receives the difference and samples the voltage Vin;
d) a second phase compensator for changing the voltage Vin in a direction that causes the power P to be equal to the reference power $P_{ref}$.

In one aspect, several Buck-boost converters generate voltages $V_A$, $V_B$ and $V_C$, for time periods with desired duty cycles, for distributing the power between three stages that operate in parallel, to obtain ripple cancelation effect.

The magnitude of the required phase-advance may be obtained by measuring the DC input power to the inverter, based on a pre-stored lookup table.

The motor may be fed by a current source, which provides the desired current to the phases.

Whenever the power source is a battery, the control circuit may comprise a bidirectional converter that is operated as a Buck converter in the forward direction and as a Boost converter in the reverse direction, for operation with a constant current or a constant voltage which are delivered to the motor.

In the forward direction, controller adjusts the voltage or current fed to the motor per the required speed and in regeneration mode, the controller adjusts the braking torque by adjusting the reverse current.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIGS. 3a and 3b (prior art) show star and triangular motor topology, respectively;

FIG. 4 (prior art) shows a model of a motor can be illustrated by a star connection;

FIG. 5 (prior art) shows a typical control circuit using an inverter that generates the required voltages and phase differences;

DETAILED DESCRIPTION OF PREFERRED EMBODIMENTS

The present invention proposes a method and circuitry for a bidirectional drive and phase correction of motor drives, for motors with separated coils.

Figure 1:
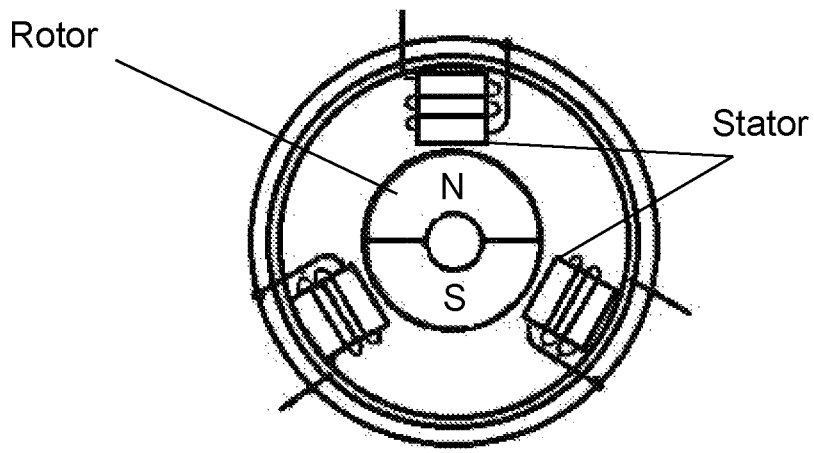
FIG. 1 (prior art) shows a motor with three poles, in which the permanent magnets are in the center, surrounded by several coils that function as controlled electromagnets.
Figure 2:
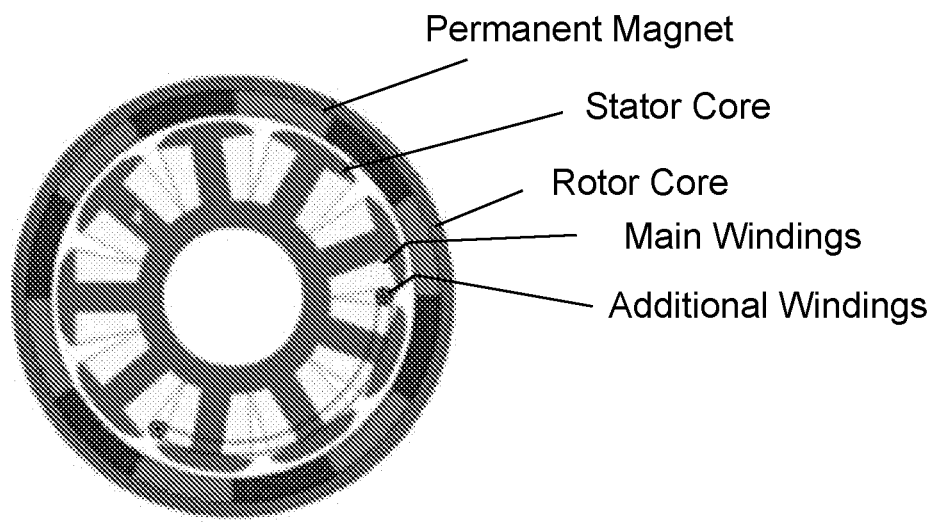
FIG. 2 (prior art) shows a motor in which several coils that function as controlled electromagnets the permanent magnets are in the center, surrounded by permanent magnets.
Figure 6:
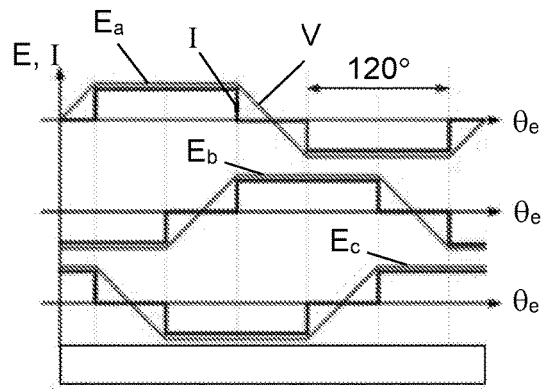
FIG. 6 (prior art) shows an optimal phase match between the current and the voltage in each branch.
Figure 7:
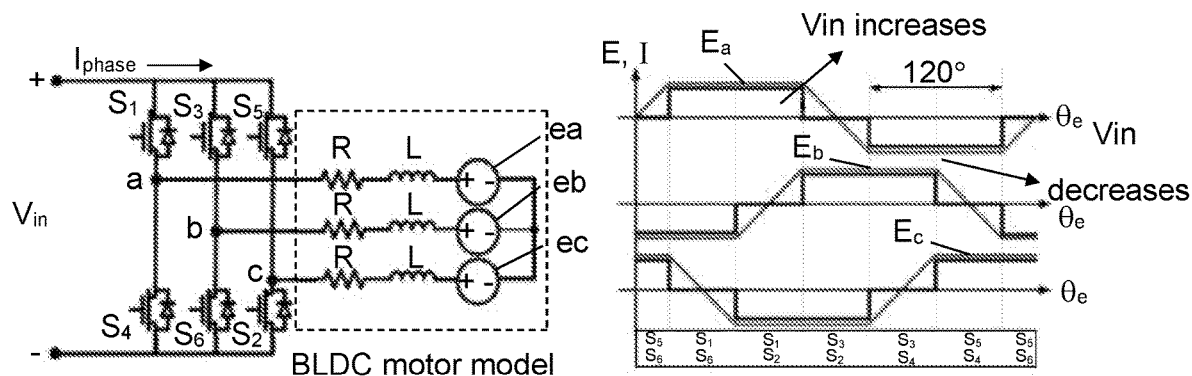
FIG. 7 (prior art) shows a motor drive circuit where the speed is controlled by the magnitude of the input voltage.
Figure 8:
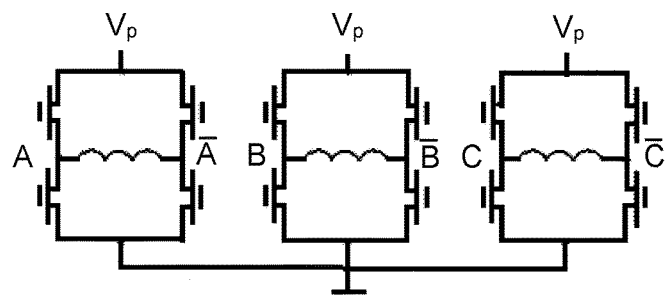
FIG. 8 (prior art) shows a motor drive circuit where the coils are separated and the input voltage is applied individually to each coil.
Figure 9:
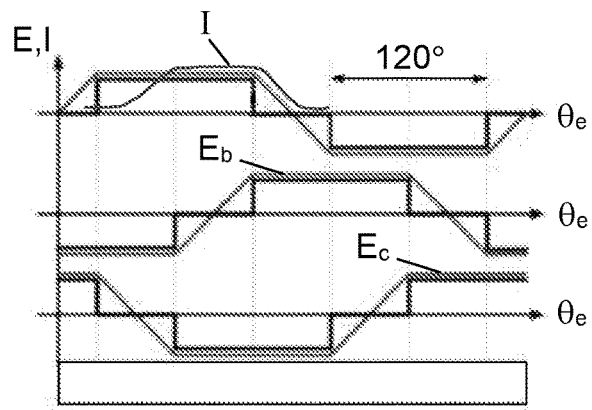
FIG. 9 shows a mismatch between the phases of the current and the voltage in each branch.
Figure 10:
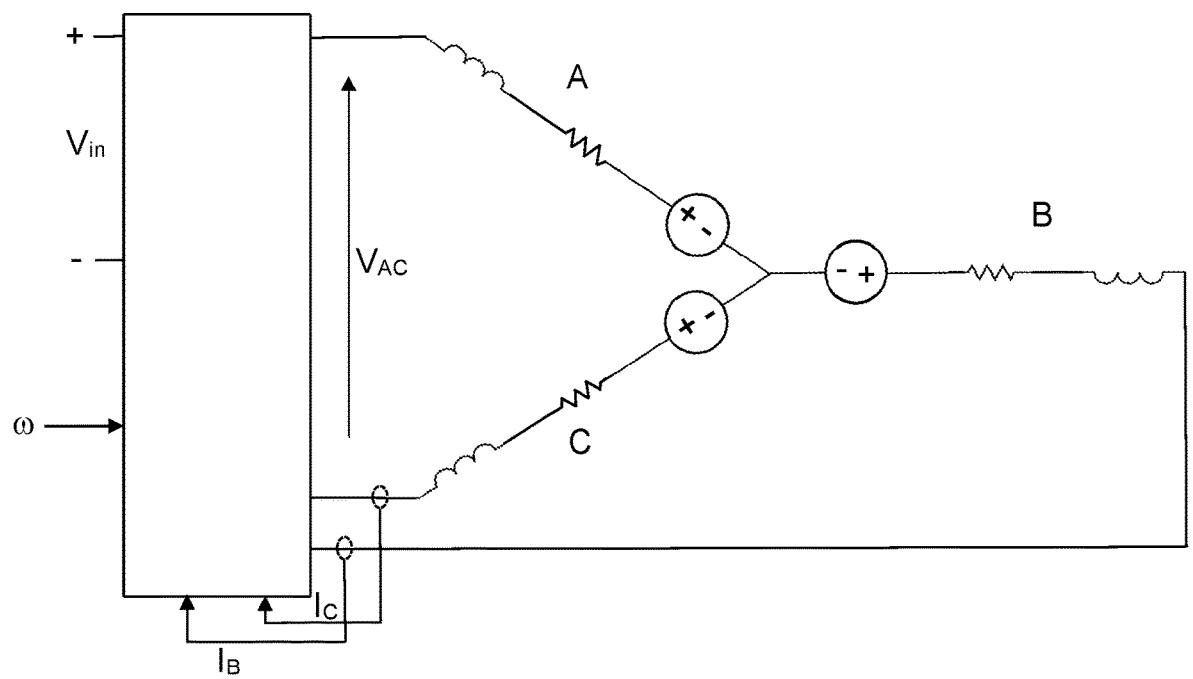
FIG. 10 shows the concept of Field Oriented Control (FOC)
Figure 11:
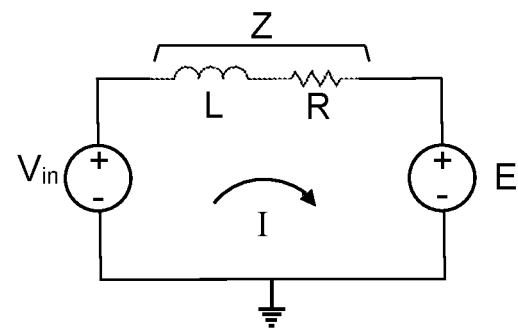
FIG. 11 shows a basic feeding path for each phase, which consists of a series connection of an inductor, followed by a resistor, which represents losses.

The basic concept of the phase correction is based on signal processing in the time domain. FIG. 11 shows a basic feeding path for each phase, which consists of a series connection of an inductor L, followed by a resistor R, which represents losses. Normally, the resistor is very small so it can be assumed that R≈0. If E represents the EMF generated in the motor coil, then:

$$L\frac{dI}{dt} = V_{in} - E \quad \text{(Eq. 1)}$$

The current flowing in the branch is $$I = \frac{1}{L}\int (Vin - E)dt \quad \text{(Eq. 2)}$$

where E is the EMF of the motor.

$$Imax = \frac{Veff}{L} \cdot \Delta t \quad \text{(Eq. 3)}$$

and $$\Delta t = \frac{Imax \cdot L}{Veff} \quad \text{(Eq. 4)}$$

where Veff is the effective voltage over the inductor L and Δt is the time needed to start applying Vin, in order to correct the unwanted phase difference between the developed voltage and the phase current.

The phase correction is related to Δt by:

$$\Delta\varphi = \frac{RPM}{60} \cdot 360 \cdot p \cdot \Delta t \quad \text{(Eq. 5)}$$

where ρ is the number of poles in the motor.

If the torque is given by M, then the mechanical power Pm is $$Pm = \omega M = 2\pi f \cdot M \quad \text{(Eq. 6)}$$

and finally, the torque M is proportional to the current I and thus from (5) and (6):

$$\Delta\varphi \approx K_1 \cdot Pm \quad \text{(Eq. 7)}$$

Where $K_1$ is a constant.

The electrical power Pe is given by the ratio between the mechanical power Pm and the efficiency η such that:

$$Pe = \frac{Pm}{\eta}$$

and assuming high efficiency, $$\Delta\varphi \approx K_2 \cdot Pe$$

where $K_1$ is a constant that takes into account the efficiency and can be measured for a given motor drive family and stored in a look-up table for each value of input DC power to the system. This in lieu of the conventional FOC.

The above derivation implies that the magnitude of the required phase-advance can be obtained by measuring the DC input power to the inverter, while K2 can be based on a pre-stored lookup table.

Figure 12:
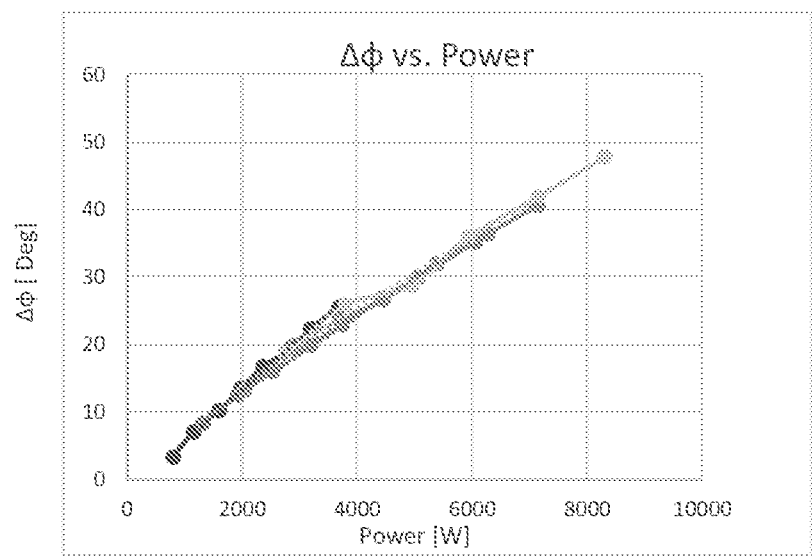
FIG. 12 shows simulation results of the obtained phase correction value Δφ as a function of power.

This considerably reduces the computing power required for deriving the phase advance in real-time. Furthermore, since it is based on a lookup table that is specific to each type of motor, it is highly accurate. The validity of the phase advance algorithm of the present invention, detailed above, has been validated experimentally. Typical results are shown in FIG. 12 which documents the required phase advance as a function of input DC power for various motor speeds. These results demonstrate the fact that the relationship between the required phase shift and input DC power is for all practical purposes is unique for a given motor family and can be used to adjust the phase shift to the optimal point.

Figure 13:
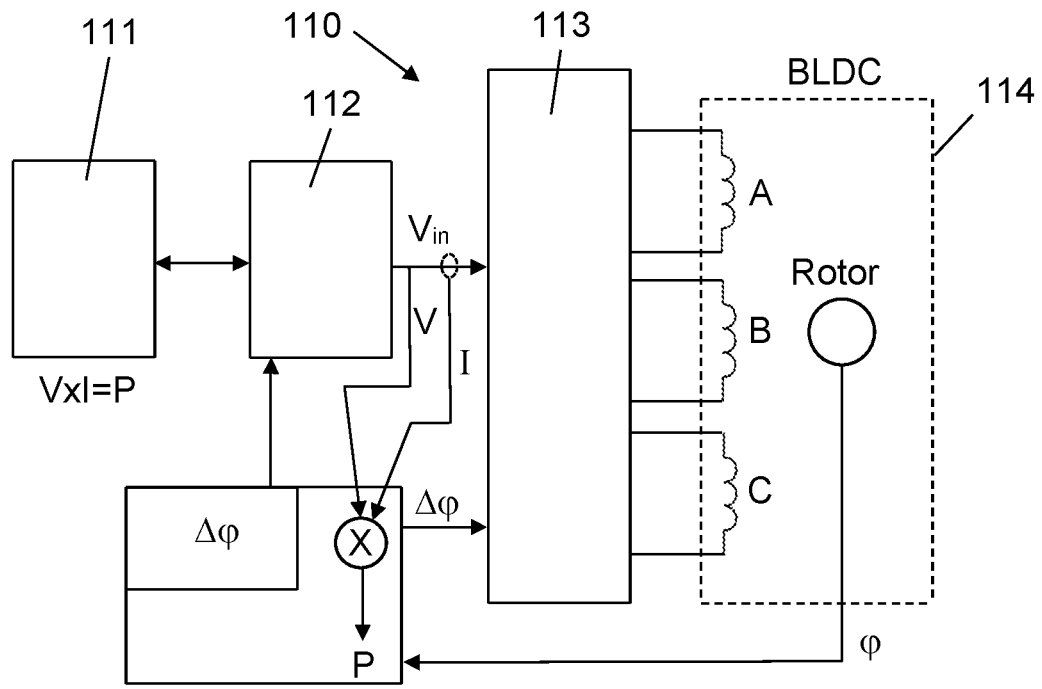
FIG. 13 shows a control apparatus that implements the method proposed by the present invention.

FIG. 13 shows a control apparatus that implements the above method. The apparatus 110 comprises a power source 111 for feeding the input power to the motor, a bidirectional DC-DC converter 112, a controlled inverter 113 for providing the input voltage Vin to the three phases A, B and C of the controlled BLDC motor 114 and a controller 116, which provides the phase correction to the controlled inverter 113. The instantaneous angle φ of the rotor 115 is measured (sampled) and fed into controller 116, which also samples the input voltage Vin and the current I of each phase and obtains the input power P. The phase difference value Δφ that corresponds to each value of power P is retrieved from a look-up table that is stored in advance in a memory (not shown) and fed into the controlled inverter 113, which provides Vin to each phase with the appropriate angle (i.e., phase separated input voltages), such that there will be an optimal match between the voltage and the current of each coil.

By calculating the phase difference Δφ value, the desired angular velocity co, the desired torque and the desired phase current may be obtained.

Figure 14:
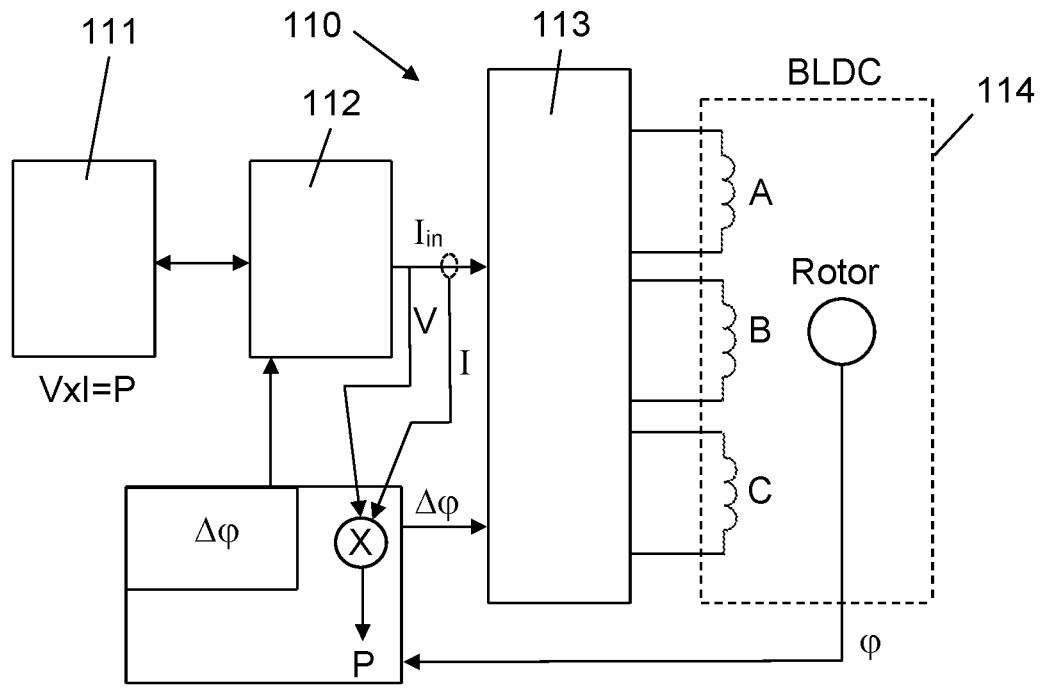
FIG. 14 illustrates an embodiment in which the motor is fed by a current source.

In another embodiment of the invention, illustrated by FIG. 14, the motor is fed by a current source and hence, the current shape is determined by the drive and not by the impedance of the phases. In this configuration, the up-down converter acts like a current source to feed the desired current to the phases.

Figure 15A:
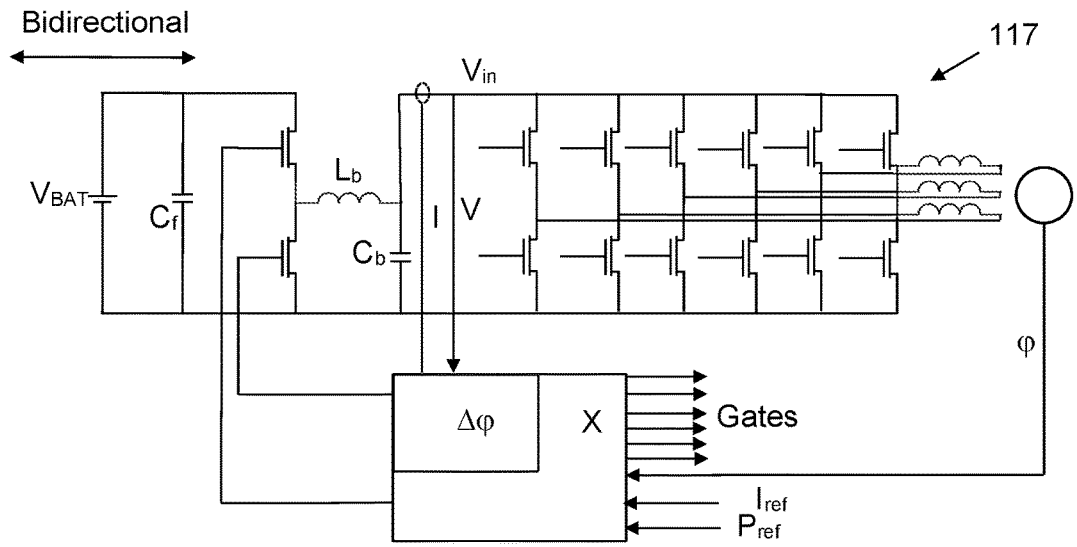
FIG. 15a illustrates a possible circuit 117, which is an exemplary implementation of the apparatus of FIG. 12 or FIG. 14 above in which the power source is a battery.

FIG. 15 illustrates a possible circuit 117, which is an exemplary implementation of the apparatus of FIG. 12 or FIG. 14 above in which the power source is a battery. The circuit comprises a bidirectional converter 120 that is operated as a Buck converter in the forward direction and as a Boost converter in the reverse direction (three bridges 121a, 121b and 121c for the separated coils of phases A, B and C, respectively). This configuration enables the operation with a constant current or a constant voltage which are delivered to the motor. The difference being (a) the control algorithm and (b) the size of capacitor Cb. In voltage mode, the control controls the voltage across Cb while in current mode, the control is of the current while Cb is used to reduce the high frequency ripple and spikes. In the forward direction, controller 116 adjusts the voltage or current fed to the motor per the required speed. In the regeneration mode, the controller adjusts the braking torque by adjusting the reverse current.

Figure 15B:
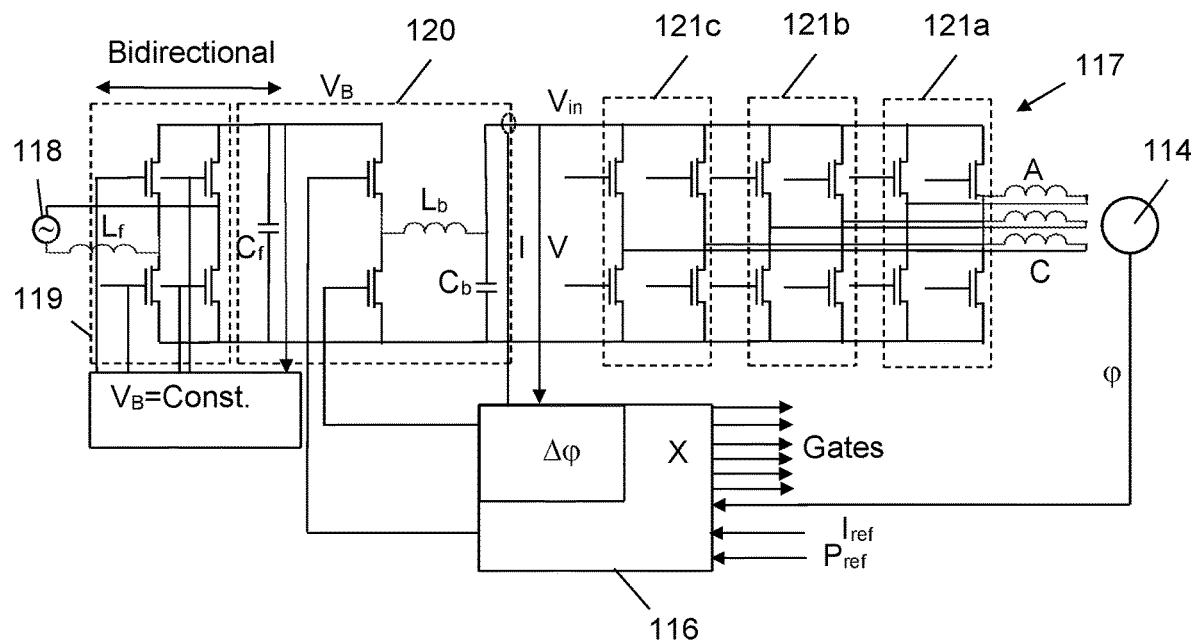
FIG. 15b illustrates an embodiment of the invention in which the power source is the power line.
Figure 16A:
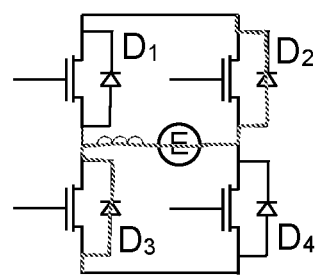
FIGS. 16a-16d illustrate possible regeneration operating modes, according to an embodiment of the invention.
Figure 16B:
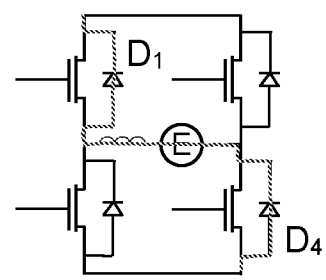
Figure 16C:
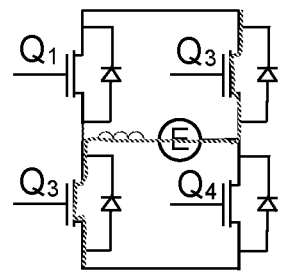
Figure 16D:
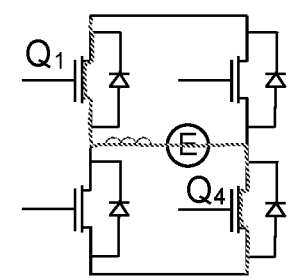

FIG. 15b illustrates an embodiment of the invention in which the power source is the power line. Controller 116 adjust the motor forward and reverse motor current while the controller 121 of the rectifier/inverter 119 keeps voltage $V_B$ constant at all time. Upon detecting that voltage $V_B$ decreases, controller 122 pushes more power from power line 118 into bridge 119 and upon detecting that voltage $V_B$ increases, controller 122 returns power into grid 118 (i.e., power regeneration). Buck-boost converter 120 uses is controlled by 116 to feed energy to the motor 114 using up/down conversion in a relatively high PWM switching frequency, while the switching frequency of the motor inverter bridges 121a, 121b and 121c operate at the low frequency of the motor's electrical frequency.

Controller 116 controls the input/output power P, by the up/down converter, calculates phase difference Δφ value and the inverter's modulation level that correspond to each value of power P and generates appropriate signals to the gates of bridges 121a, 121b and 121c.

FIG. 16 illustrates a regeneration operating mode, according to an embodiment of the invention. In this case, the voltage E across the motor's separate coils is greater than the input voltage Vin and regeneration current I may flow via diodes $D_3$ and $D_2$ as shown in FIG. 16a or via diodes $D_4$ and $D_1$ as shown in FIG. 16b. Alternatively, in order to reduce power loss, current I may flow via transistors $Q_3$ and $Q_2$ as shown in FIG. 16c or via transistors $Q_4$ and $Q_1$ as shown in FIG. 16d, since the voltage drop across a conducting transistor is lower than across a conducting diode.

Figure 17:
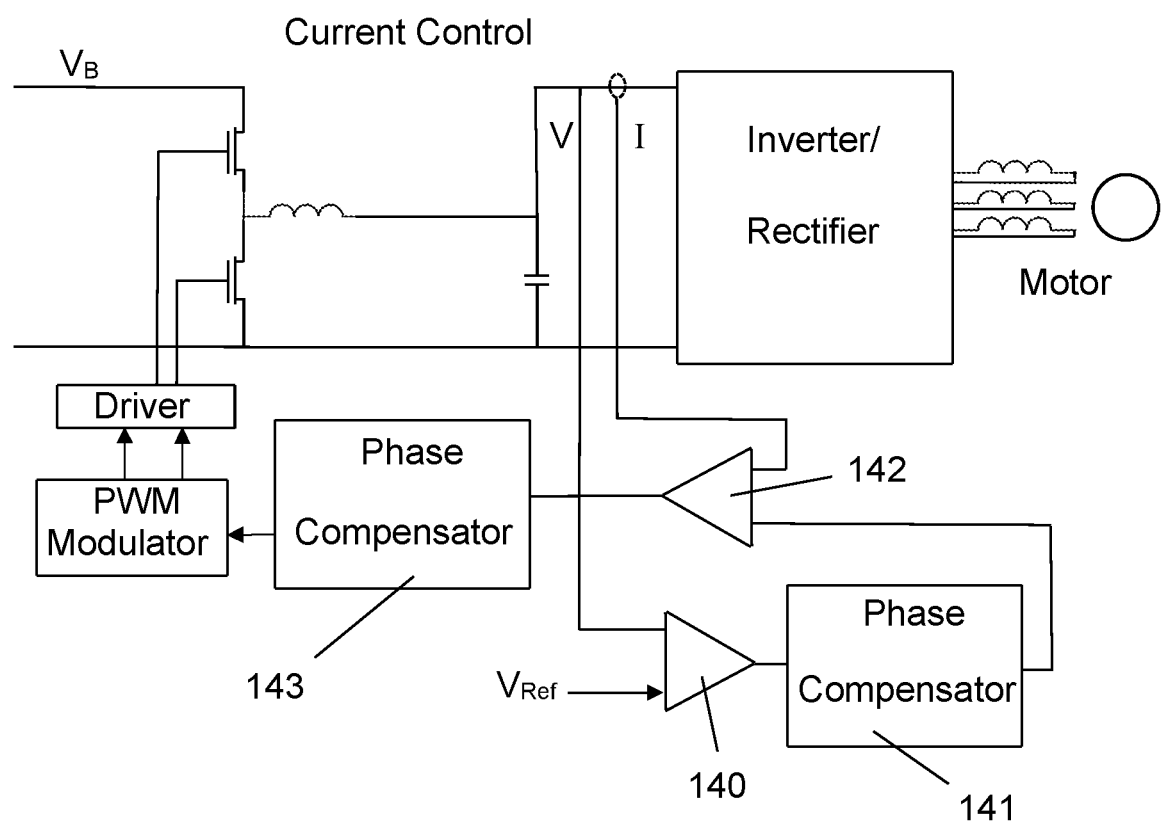
FIG. 17 illustrates a current-based voltage control, according to an embodiment of the invention.

FIG. 17 illustrates a current-based voltage control, according to an embodiment of the invention. In this case, the voltage V is measured and compared by comparator 140 to a desired reference voltage $V_{ref}$. The difference between V and $V_{ref}$ is fed into a first phase compensator 141, the output of which is input into a second comparator 142 which samples the voltage I. A second phase compensator 143 feeds a PWM modulator that controls the up/down converter to force I to be equal to $I_{ref}$.

Figure 18:
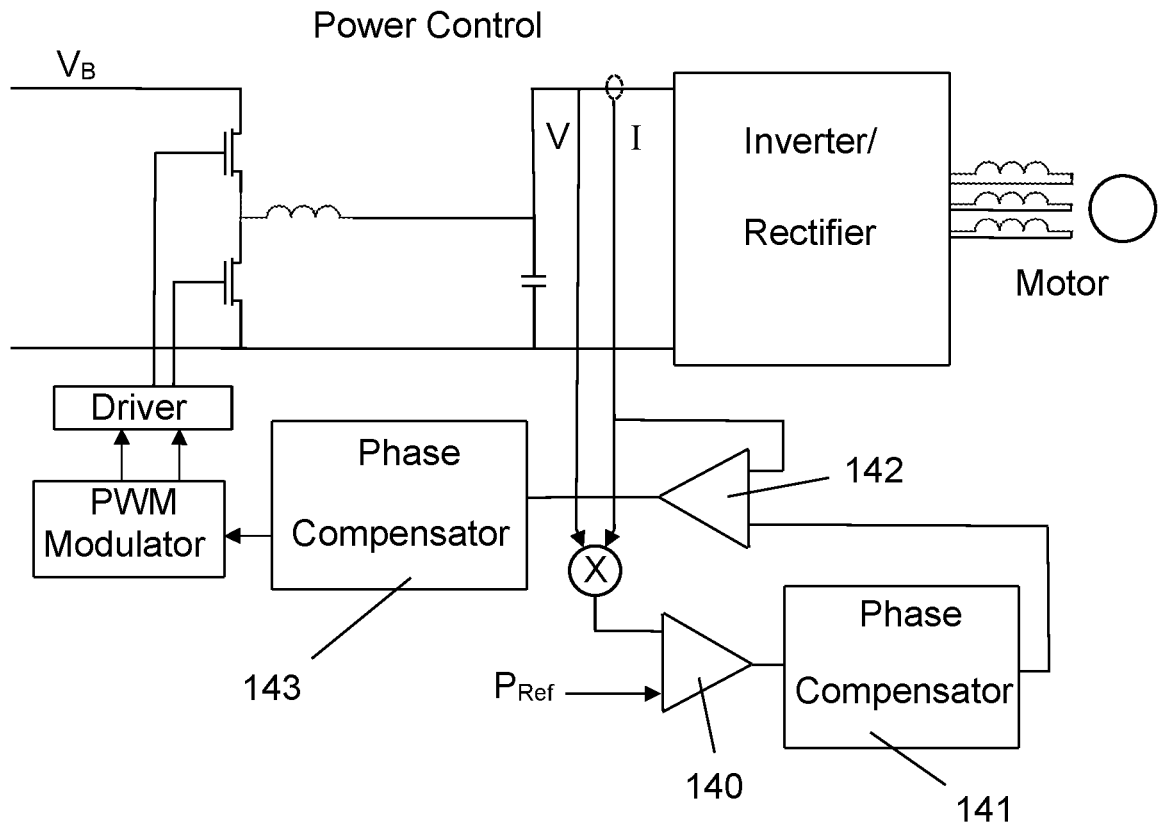
FIG. 18 illustrates a power-based control, according to an embodiment of the invention.

FIG. 18 illustrates a power-based control, according to an embodiment of the invention. In this case, both the current I and the voltage Vin are measured and their product P is compared by comparator 140 to a desired reference power $P_{ref}$. The difference between P and $P_{ref}$ is fed into a first phase compensator 141, the output of which is input into a second comparator 141 which samples the voltage Vin. A second phase compensator 143 changes the voltage Vin in a direction that causes the power P to be equal to the reference power $P_{ref}$.

Figure 19:
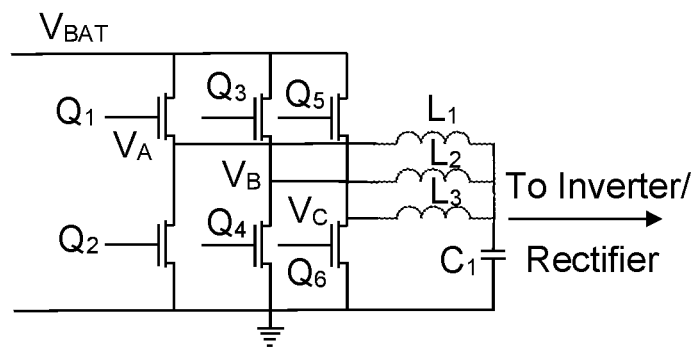
FIG. 19 shows another embodiment, in which the up/down converter comprises a number of parallel and interleaved Buck-boost converters.

FIG. 19 shows another embodiment, in which the up/down converter comprises a number of parallel and interleaved Buck-boost converters (instead of one Buck-boost converter 120, as shown in FIG. 12). In this example, there are three Buck-boost converter 120a (consisting of a serial connection of $Q_1$ and $Q_2$), 120b (consisting of a serial connection of $Q_3$ and $Q_4$) and 120c (consisting of a serial connection of $Q_5$ and $Q_6$), which generate voltages $V_A$, $V_B$ and $V_C$, respectively, where the output inductors are $L_1$, $L_2$ and $L_3$ and the output capacitor is $C_1$.

Figure 20:
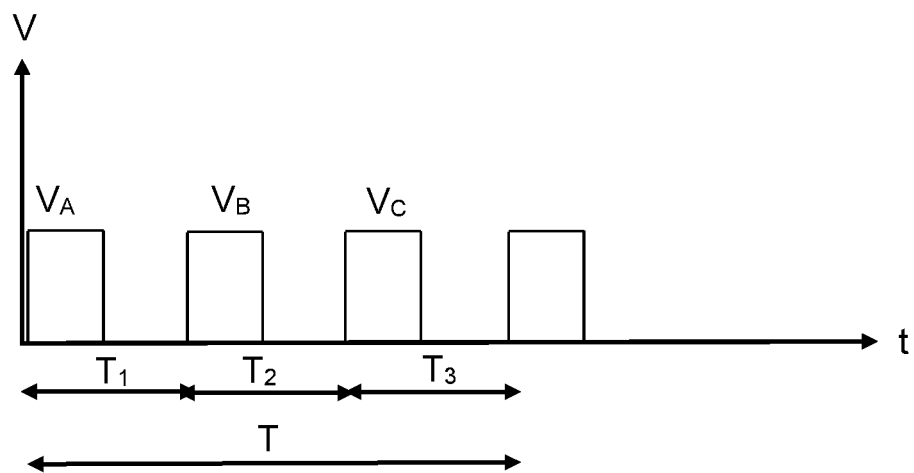
FIG. 20 shows a mode of operation that allows distributing the power between three stages that operate in parallel and as a result, obtaining better power dissipation and less heating of the transistors.
Figure 21:
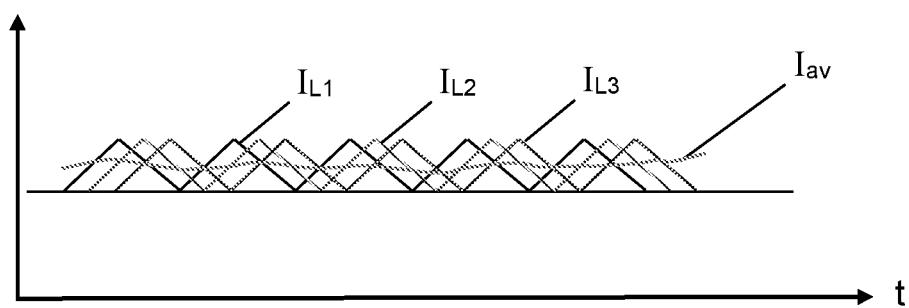
FIG. 21 shows a cancelation effect that allows the average current Iav and the voltage across capacitor C1 to have lower ripple.

When $Q_1$ conducts, the voltage $V_A$ is generated for part of the time period $T_1$ and then falls down to zero when $Q_2$ conducts. When $Q_3$ conducts, the voltage $V_B$ is generated for part of the time period $T_2$ and then falls down to zero when $Q_4$ conducts. When $Q_5$ conducts, the voltage $V_C$ is generated for part of the time period $T_3$ and then falls down to zero when $Q_6$ conducts. The total period time for this system is $T=T_1+T_2+T_3$. This mode of operation (shown in FIG. 20) allows distributing the power between three stages that operate in parallel and as a result, obtaining better power dissipation and less heating of the transistors. Since the generated voltage pulses $V_A$, $V_B$ and $V_C$ are shifted in time, the resulting currents $I_{L1}$, $I_{L2}$ and $I_{L3}$ in coils $L_1$, $L_2$ and $L_3$ are also shifted in time. This provides an additional advantage since currents $I_{L1}$, $I_{L2}$ and $I_{L3}$ are added to each other on capacitor $C_1$ and the resulting average current $I_{av}$ and the voltage across capacitor $C_1$ has a lower ripple (depending on the duty cycle), resulting from cancelation, as shown in FIG. 21. This cancelation effect also allows using smaller inductors $I_{L1}$, $I_{L2}$ and $I_{L3}$.

It should be noted that the embodiment of FIG. 21 (that is directed to a motor with three poles) may be extended to any number of N poles by including N Buck-boost converters and N corresponding output inductors $L_1, L_2, \ldots, L_N$ (all connected to the output capacitor is $C_1$), while obtaining the above advantages.

Figure 22:
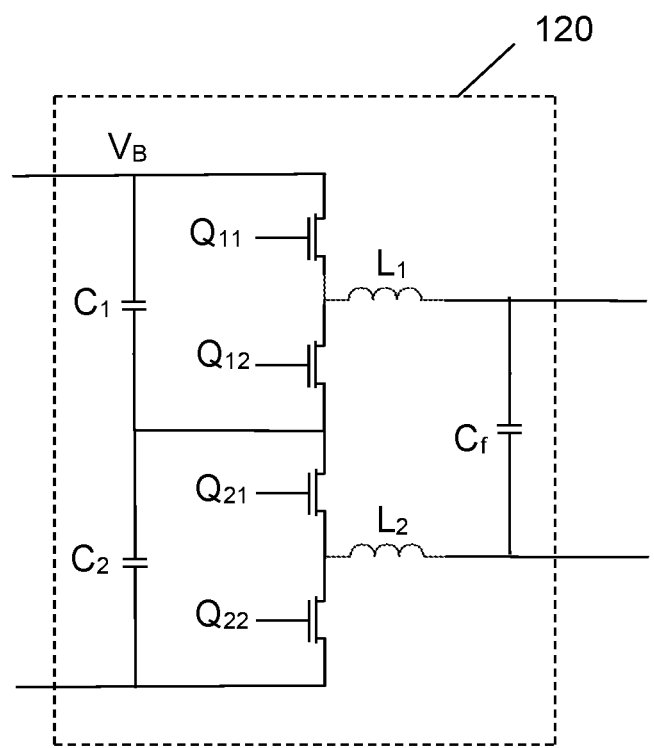
FIG. 22 shows an embodiment in which the up-down converter is formed by a multilevel converter consisting of two half bridges in a totem pole configuration.

In an alternative embodiment of the invention, illustrated in a generic form in FIG. 22, the up-down converter 120 is formed by a multilevel converter consisting of two half bridges in a totem pole configuration. Q11, Q12 and L1 form one Buck/Boost converter, while Q21, Q22 and L2 form a second Buck/Boost converter. The outputs of the two Buck/Boost converters are serially connected to form one output that feeds the inverter. The two converters can be operated in a step-down mode for feeding the motor and in a step-up (Boost) mode in the reverse direction (regeneration). The advantage of the embodiment of FIG. 22 is that the maximum voltage drop of each transistor is $V_B/2$ which enables the use of lower voltage, but faster transistors, thereby lowering switching losses. Furthermore, by operating the two converters interleaved, ripple current cancelation can be achieved.

Although illustrated by one half bridge per converter, as will be clear to a person skilled in the art, the circuit of FIG. 22 can be realized by several half bridges in parallel for higher current capability and current ripple reduction.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:
1. A method for efficiently providing drive power to a BrushLess Direct Current (BLDC) motor, comprising:
 a) providing a BLDC motor having separate coils;
 b) providing a controller for controlling levels and phases of input voltages supplied to said separate coils;
 c) providing a controlled inverter with outputs, for applying phase separated input voltages to each of said separate coils at desired timing for each input voltage, determined by said controller;
 d) providing a power source for feeding power to said controlled inverter;
 e) for each motor type, generating and storing, in a memory, a look-up table containing a phase difference value that corresponds to each value power P;
said controller is adapted to:
 f) sample an instantaneous angle φ of the rotor of said BLDC motor;
 g) measure the input power P to all phases; and
 h) for each input power P, retrieve from said look-up table, a corresponding phase difference Δφ value between one of the input voltages and others input voltages and an inverter's modulation level that corresponds to said input power P and feed said phase difference value to said controlled inverter.

2. The method according to claim 1, wherein the phase difference Δφ value is calculated for obtaining one or more of the following:
 desired angular velocity ω
 desired torque;
 desired phase current.

3. The method according to claim 1, further comprising providing an up/down DC-DC converter for converting the feeding power to said input voltages according to a command signal provided by the controller.

4. The method according to claim 3, wherein the DC-DC converter is selected from the group of:
 bidirectional converter;
 bidirectional Buck/boost converter;
 bidirectional multiphase converter.

5. The method according to claim 1, wherein the power source is one of the following:
 a battery;
 an AC power grid followed by a bridge rectifier.

6. The method according to claim 1, wherein the inverter's modulation type is Pulse Width Modulation (PWM) or Space Vector Modulation (SVM).

7. The method according to claim 1, comprising:
 providing an up/down DC-DC converter for converting said feeding power to said input voltages according to a command signal provided by said controller,
said controller is adapted to:
 sample the instantaneous angle of the rotor of said BLDC motor;
 sample the input voltage Vin and a current I of each phase to obtain the input power P; and
 for each Vin, calculate the phase difference Δφ value that corresponds said input power P and feed said phase difference value to said up/down DC-DC converter, thereby causing said up/down DC-DC converter to apply each Vin to its corresponding coil at a specific timing for obtaining an optimal match between said each Vin and the current that is being built up in said corresponding coil.

8. The method according to claim 7, wherein the up/down DC-DC converter is bidirectional, for allowing excess power generated in the motor to flow back to the power source, for during regeneration operating mode, where the voltage E across the motor's coils is greater than the input voltage Vin.

9. A drive system for a BrushLess Direct Current (BLDC) motor having poles implemented by separate coils that are activated in corresponding phases, comprising:
 a) a controller for controlling levels and phases of input voltages supplied to said separate coils;
 b) a controlled inverter with outputs, for applying phase separated input voltages to each of said separate coils at desired timing for each input voltage, determined by said controller;
 c) a power source for feeding power to said controlled inverter;
 d) an up/down DC-DC converter for converting said feeding power to said input voltages according to a command signal provided by said controller,
said controller is adapted to:
 e) sample an instantaneous angle φ of the rotor of said BLDG motor;
 f) sample the input voltage yin and a current I of each phase to obtain an input power P; and g) for each motor type, generating and storing, in a memory, a look-up table said controller is adapted to:

h) sample an instantaneous angle φ of the rotor of said BLDG motor;

i) measure the input power P to all phases; and j) for each input power P of a motor type, retrieve from a look-up table containing a phase difference value Δφ that corresponds to each value of input power P, a corresponding phase difference Δφ value between one of the input voltages and others input voltage;

k) and feed said phase difference value to said up/down DC-DC converter, thereby causing said up/down DC-DC converter to apply each Vin to its corresponding coil at a specific timing for obtaining an optimal match between said each Vin and the current that is being built up in said corresponding coil.

10. The drive system according to claim 9, comprising:
    a) a bidirectional bridge connected to a power source having a constant voltage $V_B$ and being adapted to operate as a rectifier to one direction or as an inverter to the opposite direction;
    b) the up/down DC-DC converter connected to said bidirectional bridge;
    c) the controlled inverter comprising a plurality of bridges, each of which distributing an input voltage Vin to a corresponding coil of said motor;
    wherein, the controller is adapted to:
    d) calculate phase difference Δφ that corresponds to each value of power P and generate appropriate signals to the gates of said plurality of bridges;
    e) push more power into said bidirectional bridge upon detecting that voltage $V_B$ decreases, and to return power into said power source upon detecting that voltage $V_B$ increases.

11. The drive system according to claim 10, in which up/down conversion is performed in a relatively high frequency, while operating plurality of bridges with relatively low frequency.

12. The drive system according to claim 9, adapted to operate with a constant current or a constant power which are delivered to the motor.

13. The drive system according to claim 9, in which during a regeneration operating mode when a voltage E across the motor's coils is greater than the input voltage Vin, a regeneration current is directed to flow via diodes.

14. The drive system according to claim 13, in which during a regeneration operating mode when the voltage E across the motor's cods is greater than the input voltage Yin, the regeneration current is directed to flow via transistors, parallelly connected to the diodes to reduce power losses.

15. The drive system according to claim 9, comprising:
    a) a first comparator for measuring the current and compared said current to a desired reference current $I_{ref}$ and for outputting the difference between I and $I_{ref}$;
    b) a second comparator which receives the output of said first comparator and samples the voltage Vin; and
    c) a second phase compensator for changing the voltage Vin in a direction that causes the current I to be equal to the reference current $I_{ref}$.

16. The drive system according to claim 9, in which whenever the control is a power-based control, said system comprises:
    a) a comparator for comparing the product of the current I and the voltage Yin to a desired reference power $P_{ref}$;
    b) a first phase compensator that receives the difference between P and $P_{ref}$;
    c) a second comparator which receives said difference and samples the voltage Vin;
    d) a second phase compensator for changing the voltage Vin in a direction that causes the power P to be equal to the reference power $P_{ref}$.

17. The drive system according to claim 9, in which several Buck-boost converters generate voltages $V_A$, $V_A$ and $V_C$, for time periods with desired duty cycles, for distributing the power between three stages that operate in parallel, to obtain ripple cancelation effect.

18. The drive system according to claim 9, in which the motor is fed by a current source, which provides a desired current to the phases.

19. The drive system according to claim 9, in which whenever the power source is a battery, the control circuit comprises a bidirectional converter that is operated as a Buck converter in the forward direction and as a Boost converter in the reverse direction, for operation with a constant current or a constant voltage which are delivered to the motor.

20. The drive system according to claim 9, in which in the forward direction, the controller adjusts the voltage or current fed to the motor per a required speed and in regeneration mode, said controller adjusts a braking torque by adjusting a reverse current.

* * * * *